US012787142B2

(12) United States Patent
Gong

(10) Patent No.: US 12,787,142 B2
(45) Date of Patent: Nov. 3, 2026

(54) EMERGENCY DETECTION CIRCUIT AND APPARATUS COMPATIBLE WITH TRIAC DIMMER

(71) Applicant: Shanghai Xinquan Microelectronics Technology Co., Ltd., Shanghai (CN)

(72) Inventor: Daoxing Gong, Shanghai (CN)

(73) Assignee: SHANGHAI XINQUAN MICROELECTRONICS TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 19/214,369

(22) Filed: May 21, 2025

(65) Prior Publication Data

US 2026/0013021 A1 Jan. 8, 2026

(30) Foreign Application Priority Data

Jul. 5, 2024 (CN) ......................... 202410895260.3

(51) Int. Cl.
*H05B 47/17* (2020.01)
*H02J 9/02* (2006.01)
*H05B 45/31* (2020.01)
*H05B 45/38* (2020.01)

(52) U.S. Cl.
CPC .............. *H05B 47/172* (2024.01); *H02J 9/02* (2013.01); *H05B 45/31* (2020.01); *H05B 45/38* (2020.01)

(58) Field of Classification Search
CPC ...... H05B 47/172; H05B 45/31; H05B 45/38; H02J 9/02
See application file for complete search history.

(56) References Cited

U.S. PATENT DOCUMENTS

2020/0076227 A1* 3/2020 Makwana ................. H02J 7/00
2020/0344857 A1* 10/2020 Chen ....................... H05B 45/48
2021/0226475 A1* 7/2021 Zhou ..................... B60Q 11/002
2021/0384760 A1* 12/2021 Hsia .......................... H02J 7/04

* cited by examiner

*Primary Examiner* — Raymond R Chai
(74) *Attorney, Agent, or Firm* — MUNCY, GEISSLER, OLDS & LOWE, P.C.

(57) ABSTRACT

The present invention provides an emergency detection circuit and apparatus compatible with a triac dimmer. In the emergency detection circuit, a boost module, a grid status detection and control module, a boost freewheeling circuit connected to an AC neutral line, an emergency battery, an emergency light module, a rectifier circuit, and a triac dimmer connected to an AC live line are electrically connected. When detecting an abnormal AC voltage, the grid status detection and control module controls the boost module to provide a boost voltage in an intermittent periodic manner to ensure normal operation of a triac switch and conduction of the boost freewheeling circuit. The grid status detection and control module samples a voltage signal via the boost voltage sampling terminal and determines, based on a sampled voltage, whether to control the emergency light module to enter an emergency lighting mode. This achieves a technical solution for controlling an emergency light compatible with a triac dimmer.

10 Claims, 2 Drawing Sheets

EMERGENCY DETECTION CIRCUIT AND APPARATUS COMPATIBLE WITH TRIAC DIMMER

FIELD OF TECHNOLOGY

The present invention relates to the field of emergency lighting technology, particularly to an emergency detection circuit and apparatus compatible with a triac dimmer.

BACKGROUND

At present, the commonly used method for an emergency light to detect a power outage state is the loop impedance detection method. However, the loop impedance detection method is only applicable to scenarios with mechanical switches. When an emergency light using the loop impedance detection method is connected to a triac dimmer switch and a power outage occurs, a low battery voltage prevents the triac dimmer switch from operating normally. As a result, the emergency light cannot determine an operating state of the triac dimmer switch and fails to enter an emergency state properly.

Therefore, there is a need to provide a technical solution for controlling an emergency light that is compatible with a triac dimmer.

SUMMARY

To resolve the above technical problem, the present invention provides an emergency detection circuit and apparatus compatible with a triac dimmer.

The emergency detection circuit compatible with a triac dimmer provided in the present invention includes a boost module, a grid status detection and control module, and a boost freewheeling circuit.

An enable terminal and a boost voltage sampling terminal of the grid status detection and control module are electrically connected to a control terminal and a boost voltage terminal of the boost module respectively, a boost freewheeling drive terminal of the grid status detection and control module is electrically connected to a control terminal of the boost freewheeling circuit, a power terminal of the grid status detection and control module is configured to be electrically connected to a positive electrode of an emergency battery, an emergency light drive terminal of the grid status detection and control module is configured to be electrically connected to a control terminal of an emergency light module, and a voltage sampling terminal of the grid status detection and control module is configured to be electrically connected to a positive electrode output terminal of a rectifier circuit.

A boost output terminal of the boost module is configured to be electrically connected to both a first terminal of the triac dimmer and a first input terminal of the rectifier circuit, and a power terminal of the boost module is electrically connected to the positive electrode of the emergency battery.

An input terminal of the boost freewheeling circuit is configured to be electrically connected to an AC (alternating current) neutral line, and an output terminal of the boost freewheeling circuit is electrically connected to ground.

A second terminal of the triac dimmer is configured to be electrically connected to an AC live line.

When detecting an abnormal AC voltage, the grid status detection and control module controls the boost module to provide a boost voltage in an intermittent periodic manner and controls the boost freewheeling circuit to conduct.

The triac dimmer is subjected to the boost voltage to ensure normal operation of a triac switch thereof.

The grid status detection and control module samples a voltage signal via the boost voltage sampling terminal and determines, based on a sampled voltage, whether to control the emergency light module to enter an emergency lighting mode.

In a possible implementation, the boost module includes a boost control chip, a PMOS transistor, an inductor, a first diode, a second diode, a first resistor, a second resistor, and a capacitor.

A battery terminal of the boost control chip is electrically connected to a source of the PMOS transistor and configured to be connected to the positive electrode of the emergency battery, a first sampling pin of the boost control chip is electrically connected to both a drain of the PMOS transistor and a first terminal of the inductor, a switch transistor pin of the boost control chip is electrically connected to both a second terminal of the inductor and a positive electrode of the first diode, a second sampling pin of the boost control chip is electrically connected to both a first terminal of the first resistor and a first terminal of the second resistor, and a ground pin of the boost control chip is electrically connected to all a negative electrode of the emergency battery, a second terminal of the second resistor, and a first terminal of the capacitor, and grounded.

A base of the PMOS transistor is electrically connected to the enable terminal of the grid status detection and control module.

A negative electrode of the first diode is electrically connected to all a positive electrode of the second diode, a second terminal of the first resistor, and a second terminal of the capacitor, and serves as the boost voltage terminal.

A negative electrode of the second diode serves as the boost output terminal.

In a possible implementation, the grid status detection and control module includes a control chip, a third resistor, a fourth resistor, a fifth resistor, and a sixth resistor.

A power terminal of the control chip is configured to be electrically connected to the positive electrode of the emergency battery, an enable terminal of the control chip is electrically connected to the control terminal of the boost module, a first output terminal of the control chip is configured to be electrically connected to the control terminal of the emergency light module, a second output terminal of the control chip is electrically connected to the control terminal of the boost freewheeling circuit, a first sampling terminal of the control chip is electrically connected to both a first terminal of the third resistor and a first terminal of the fourth resistor, a second sampling terminal of the control chip is electrically connected to both a first terminal of the fifth resistor and a second terminal of the sixth resistor, and a ground terminal of the control chip, a second terminal of the fourth resistor, and the second terminal of the sixth resistor are all electrically grounded.

A second terminal of the third resistor is electrically connected to the boost voltage terminal of the boost module.

A second terminal of the fifth resistor is configured to be electrically connected to an output terminal of the rectifier circuit.

In a possible implementation, the boost freewheeling circuit includes a first NMOS transistor and a seventh resistor.

A base of the first NMOS transistor is electrically connected to the boost freewheeling drive terminal of the grid status detection and control module, a drain of the first NMOS transistor is electrically connected to a first terminal of the seventh resistor, and a source of the first NMOS transistor is electrically grounded.

A second terminal of the seventh resistor is configured to be electrically connected to the AC neutral line.

The present invention further provides an emergency lighting apparatus compatible with a triac dimmer, including the emergency battery, the emergency light module, and the emergency detection circuit as described above.

The positive electrode of the emergency battery is electrically connected to all the power terminal of the grid status detection and control module, the power terminal of the boost module, and an input terminal of the emergency light module, and a negative electrode of the emergency battery and an output terminal of the emergency light module are both electrically grounded.

The control terminal of the emergency light module is electrically connected to the emergency light drive terminal of the grid status detection and control module in the emergency detection circuit.

In a possible implementation, in the emergency lighting apparatus, the emergency light module includes an emergency light and a second NMOS transistor.

A positive electrode of the emergency light is electrically connected to the positive electrode of the emergency battery, and a negative electrode of the emergency light is electrically connected to a drain of the second NMOS transistor.

A base of the second NMOS transistor is electrically connected to the emergency light drive terminal of the grid status detection and control module in the emergency detection circuit.

In a possible implementation, the emergency lighting apparatus further includes the rectifier circuit and the triac dimmer.

The positive electrode output terminal of the rectifier circuit is electrically connected to the voltage sampling terminal of the grid status detection and control module, the first input terminal of the rectifier circuit is electrically connected to both the boost output terminal of the boost module and the first terminal of the triac dimmer, a second input terminal of the rectifier circuit is configured to be electrically connected to the AC neutral line, and a negative electrode output terminal of the rectifier circuit is electrically grounded.

In a possible implementation, in the emergency lighting apparatus, the boost module includes a boost control chip, a PMOS transistor, an inductor, a first diode, a second diode, a first resistor, a second resistor, and a capacitor.

A battery terminal of the boost control chip is electrically connected to a source of the PMOS transistor and connected to the positive electrode of the emergency battery, a first sampling pin of the boost control chip is electrically connected to both a drain of the PMOS transistor and a first terminal of the inductor, a switch transistor pin of the boost control chip is electrically connected to both a second terminal of the inductor and a positive electrode of the first diode, a second sampling pin of the boost control chip is electrically connected to both a first terminal of the first resistor and a first terminal of the second resistor, and a ground pin of the boost control chip is electrically connected to all a negative electrode of the emergency battery, a second terminal of the second resistor, and a first terminal of the capacitor, and grounded.

A base of the PMOS transistor is electrically connected to the enable terminal of the grid status detection and control module.

A negative electrode of the first diode is electrically connected to all a positive electrode of the second diode, a second terminal of the first resistor, and a second terminal of the capacitor, and serves as the boost voltage terminal.

A negative electrode of the second diode serves as the boost output terminal.

In a possible implementation, in the emergency lighting apparatus, the grid status detection and control module includes a control chip, a third resistor, a fourth resistor, a fifth resistor, and a sixth resistor.

A power terminal of the control chip is electrically connected to the positive electrode of the emergency battery, an enable terminal of the control chip is electrically connected to the control terminal of the boost module, a first output terminal of the control chip is electrically connected to the control terminal of the emergency light module, a second output terminal of the control chip is electrically connected to the control terminal of the boost freewheeling circuit, a first sampling terminal of the control chip is electrically connected to both a first terminal of the third resistor and a first terminal of the fourth resistor, a second sampling terminal of the control chip is electrically connected to both a first terminal of the fifth resistor and a second terminal of the sixth resistor, and a ground terminal of the control chip, a second terminal of the fourth resistor, and the second terminal of the sixth resistor are all electrically grounded.

A second terminal of the third resistor is electrically connected to the boost voltage terminal of the boost module.

A second terminal of the fifth resistor is configured to be electrically connected to an output terminal of the rectifier circuit.

In a possible implementation, in the emergency lighting apparatus, the boost freewheeling circuit includes a first NMOS transistor and a seventh resistor.

A base of the first NMOS transistor is electrically connected to the boost freewheeling drive terminal of the grid status detection and control module, a drain of the first NMOS transistor is electrically connected to a first terminal of the seventh resistor, and a source of the first NMOS transistor is electrically grounded.

A second terminal of the seventh resistor is configured to be electrically connected to the AC neutral line.

The technical solution provided by the present invention has at least the following beneficial effects:

With arrangement of a boost module, a grid status detection and control module, and a boost freewheeling circuit, the grid status detection and control module can control the boost module to provide a boost voltage in an intermittent periodic manner during an AC power outage to ensure normal operation of a triac switch and conduction of the boost freewheeling circuit. The grid status detection and control module samples a voltage signal via a boost voltage sampling terminal and determines, based on a sampled voltage, whether to control an emergency light module to enter an emergency lighting mode. This resolves the problem of conventional emergency lighting fixtures not supporting triac dimmer switches, effectively enhancing application compatibility.

In the figure: 10. boost module; 20. grid status detection and control module; 30. boost freewheeling circuit; 40. emergency battery; 50. emergency light module; 60. rectifier circuit; and 70. triac dimmer.

DESCRIPTION OF THE EMBODIMENTS

To enhance understanding of the present invention, the following will provide a further detailed description of the present invention with reference to the drawings and embodiments. These embodiments are only used to explain the present invention and do not limit the scope of protection of the present invention.

Figure 1:
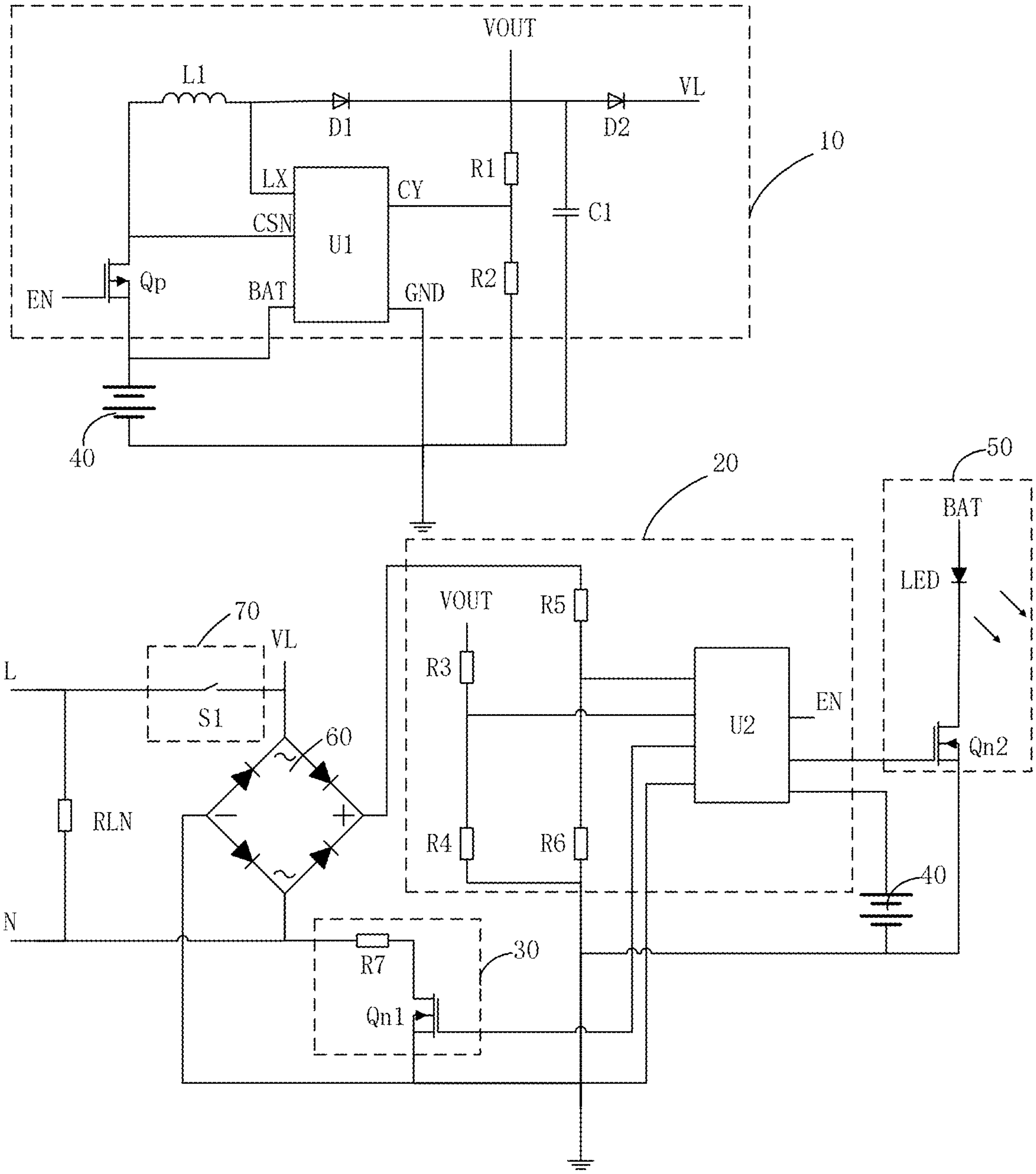
FIG. 1 is a principle diagram of a circuit of an emergency detection circuit compatible with a triac dimmer according to an embodiment of the present invention.

Referring to FIG. 1, an emergency detection circuit compatible with a triac dimmer provided in the present invention includes a boost module 10, a grid status detection and control module 20, and a boost freewheeling circuit 30.

An enable terminal EN and a boost voltage sampling terminal of the grid status detection and control module 20 are electrically connected to a control terminal and a boost voltage terminal VOUT of the boost module 10 respectively, a boost freewheeling drive terminal of the grid status detection and control module 20 is electrically connected to a control terminal of the boost freewheeling circuit 30, a power terminal of the grid status detection and control module 20 is configured to be electrically connected to a positive electrode of an emergency battery 40, an emergency light drive terminal of the grid status detection and control module 20 is configured to be electrically connected to a control terminal of an emergency light module 50, and a voltage sampling terminal of the grid status detection and control module 20 is configured to be electrically connected to a positive electrode output terminal of a rectifier circuit 60.

A boost output terminal VL of the boost module 10 is configured to be electrically connected to both a first terminal of the triac dimmer 70 and a first input terminal of the rectifier circuit 60, and a power terminal of the boost module 10 is electrically connected to the positive electrode of the emergency battery 40.

An input terminal of the boost freewheeling circuit 30 is configured to be electrically connected to an AC (alternating current) neutral line N, and an output terminal of the boost freewheeling circuit 30 is electrically connected to ground.

A second terminal of the triac dimmer 70 is configured to be electrically connected to an AC live line L.

When detecting an abnormal AC voltage, the grid status detection and control module 20 controls the boost module 10 to provide a boost voltage in an intermittent periodic manner and controls the boost freewheeling circuit 30 to conduct.

The triac dimmer 70 is subjected to the boost voltage to ensure normal operation of a triac switch S1 thereof.

The grid status detection and control module 20 samples a voltage signal via the boost voltage sampling terminal and determines, based on a sampled voltage, whether to control the emergency light module 50 to enter an emergency lighting mode.

In this embodiment, the boost module 10 may be implemented based on a conventional boost chip used for emergency lights, capable of boosting the voltage of the emergency battery 40 to the turn-on voltage of the triac dimmer 70. The grid status detection and control module 20 may be implemented based on a microcontroller, is primarily used to perform voltage sampling, output high and low levels, and the like, and can control whether the boost module 10 performs a boost operation. The boost freewheeling circuit 30 is a conventional switching circuit that may be controlled to open or close by high and low levels. The emergency battery 40 may be a conventional rechargeable battery used in the field of emergency lighting. The emergency light module 50 is a conventional emergency lighting module that may be controlled to turn on or off the emergency light by a level signal. The rectifier circuit 60 is used to convert AC to DC (direct current) and may employ a conventional rectifier bridge or be composed of several diodes. The triac dimmer 70 adopts a conventional model. When the high voltage connected to the first terminal or the second terminal of the triac dimmer 70 reaches the threshold of the turn-on voltage, it can enable the triac switch S1 therein to operate normally. In cases where it is uncertain whether there is a high voltage at the second terminal connected to the AC live line L, inputting a high voltage at the first terminal can ensure the normal operation of the triac switch S1. The switching between the closed and open states of the triac switch S1 is controlled by human operation.

During specific implementation, the grid status detection and control module 20 detects the rectified voltage output by the rectifier circuit 60 at the voltage sampling terminal in real time. When the rectified voltage is normal, it indicates that the AC is normal, and the triac switch S1 is operating normally in a closed state. The boost portion of the boost module 10 does not operate, and the grid status detection and control module 20 controls the emergency light module 50 to maintain a non-emergency mode. When the rectified voltage is abnormal, the boost portion of the boost module 10 operates to ensure the normal operation of the triac switch S1. If the triac switch S1 is in a closed state, the grid status detection and control module 20 detects a voltage falling edge signal via the boost voltage sampling terminal, indicating an AC power outage. The grid status detection and control module 20 then controls the emergency light module 50 to enter an emergency lighting mode accordingly. If the rectified voltage is abnormal and the boost portion of the boost module 10 operates to ensure the normal operation of the triac switch S1, but the triac switch S1 is in an open state, the grid status detection and control module 20 detects a high-level voltage signal via the boost voltage sampling terminal, indicating that the triac switch S1 is in an open state. In this case, it cannot be determined whether the AC is normal, and the grid status detection and control module 20 controls the emergency light module 50 to maintain a non-emergency mode accordingly.

The emergency detection circuit compatible with a triac dimmer provided by the present invention can be applied to both triac dimming scenarios and ordinary mechanical switch scenarios. It resolves the problem of conventional emergency lighting fixtures not supporting triac dimmer switches, effectively enhancing application compatibility while achieving cost optimization.

In a possible implementation, the boost module 10 includes a boost control chip U1, a PMOS transistor Qp, an inductor L1, a first diode D1, a second diode D2, a first resistor R1, a second resistor R2, and a capacitor C1.

A battery terminal BAT of the boost control chip U1 is electrically connected to a source of the PMOS transistor Qp and configured to be connected to the positive electrode of the emergency battery 40, a first sampling pin CSN of the boost control chip U1 is electrically connected to both a drain of the PMOS transistor Qp and a first terminal of the inductor L1, a switch transistor pin LX of the boost control chip U1 is electrically connected to both a second terminal of the inductor L1 and a positive electrode of the first diode D1, a second sampling pin CY of the boost control chip U1 is electrically connected to both a first terminal of the first resistor R1 and a first terminal of the second resistor R2, and a ground pin GND of the boost control chip U1 is electrically connected to all a negative electrode of the emergency battery 40, a second terminal of the second resistor R2, and a first terminal of the capacitor C1, and grounded.

A base of the PMOS transistor Qp is electrically connected to the enable terminal EN of the grid status detection and control module 20.

A negative electrode of the first diode D1 is electrically connected to all a positive electrode of the second diode D2, a second terminal of the first resistor R1, and a second terminal of the capacitor C1, and serves as the boost voltage terminal VOUT.

A negative electrode of the second diode D2 serves as the boost output terminal VL.

Figure 2:
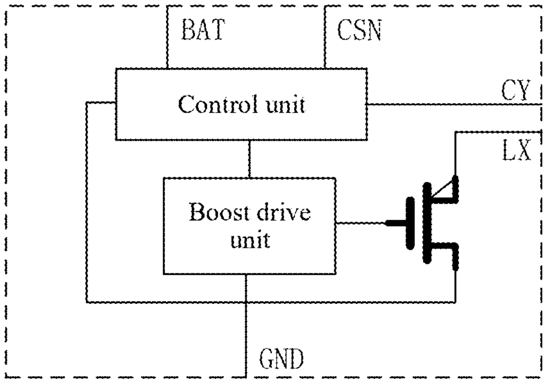
FIG. 2 is an internal operating principle diagram of an emergency light driver chip according to an embodiment of the present invention.

In this embodiment, the boost control chip U1 is a conventional model of a chip used for boost control. Its internal operating principle is shown in FIG. 2 and may include a control unit, a Boost drive unit, an internal MOS transistor, and the like. The PMOS transistor Qp is a conventional P-type MOS transistor. The inductor L1 is of a conventional model. The first diode D1 and the second diode D2 are conventional diodes. The first resistor R1 and the second resistor R2 are conventional resistors. The capacitor C1 is of a conventional model.

In the boost control chip U1, the control unit may be implemented based on a microcontroller using a conventional design, capable of performing voltage sampling and outputting high and low levels. The Boost drive unit is a conventional Boost driver that can output corresponding high and low level signals based on the input level signal. The internal MOS transistor may be a conventional N-type MOS transistor.

It can be understood that when the PMOS transistor is conducting, the boost control chip U1 performs boost operations in two phases: an inductor charging cycle and an inductor discharging cycle. During the inductor charging cycle, the internal MOS transistor conducts, forming a circuit with the emergency battery 40, the inductor L1, and the internal MOS transistor. The inductor L1 stores energy. The control unit samples the boost voltage output at the boost voltage terminal VOUT via the second sampling pin CY When it exceeds the preset maximum limit voltage, the control unit drives the Boost drive unit to pull down the gate voltage of the internal MOS transistor, causing the internal MOS transistor to turn off. During the inductor discharging cycle, the internal MOS transistor is turned off, forming a power supply path with the emergency battery 40, the inductor L1, the first diode D1, and the second diode D2. The emergency battery 40 and the inductor L1 discharge externally to provide the boost voltage. Until the sampled voltage at the second sampling pin CY falls below the minimum limit voltage set by the control unit, the control unit drives the Boost drive unit to raise the gate voltage of the internal MOS transistor, causing the internal MOS transistor to conduct. This process is repeated to continuously provide the boost voltage.

In a possible implementation, the grid status detection and control module 20 includes a control chip U2, a third resistor R3, a fourth resistor R4, a fifth resistor R5, and a sixth resistor R6.

A power terminal of the control chip U2 is configured to be electrically connected to the positive electrode of the emergency battery 40, an enable terminal of the control chip U2 is electrically connected to the control terminal of the boost module 10, a first output terminal of the control chip U2 is configured to be electrically connected to the control terminal of the emergency light module 50, a second output terminal of the control chip U2 is electrically connected to the control terminal of the boost freewheeling circuit 30, a first sampling terminal of the control chip U2 is electrically connected to both a first terminal of the third resistor R3 and a first terminal of the fourth resistor R4, a second sampling terminal of the control chip U2 is electrically connected to both a first terminal of the fifth resistor R5 and a second terminal of the sixth resistor R6, and a ground terminal of the control chip U2, a second terminal of the fourth resistor R4, and the second terminal of the sixth resistor R6 are all electrically grounded.

A second terminal of the third resistor R3 is electrically connected to the boost voltage terminal VOUT of the boost module 10.

A second terminal of the fifth resistor R5 is configured to be electrically connected to an output terminal of the rectifier circuit 60.

In this embodiment, the control chip U2 is a conventional processing chip, which may specifically be implemented using a microcontroller. The third resistor R3, the fourth resistor R4, the fifth resistor R5, and the sixth resistor R6 are all conventional model resistors.

In a specific implementation, the control chip U2 monitors the level signal between the fifth resistor R5 and the sixth resistor R6 in real time. When the level signal is a high-level voltage signal, after it is determined that the AC voltage is normal, the enable terminal of the control chip U2 outputs a high-level command and its second output terminal outputs a low-level command, putting the system in a standby state. When the level signal is a low-level voltage signal, in an intermittent periodic manner, this enable terminal outputs a low-level command, and its second output terminal outputs a high-level command, causing the boost portion of the boost module 10 and the boost freewheeling circuit 30 to operate simultaneously. Regardless of whether the AC power is normal, when the boost portion of the boost module 10 operates, it can ensure the normal operation of the triac switch S1.

When the level signal between the fifth resistor R5 and the sixth resistor R6 monitored by the control chip U2 is a low-level voltage signal, it is handled in two ways. When the triac switch S1 is in an open state, since there is no current path, the output voltage signal from the boost portion of the boost module 10 passes through the third resistor R3 and the fourth resistor R4 to the signal sampling terminal of the control chip U2, that is, the first sampling terminal. At the same time, the control chip U2 sets the drive level of the emergency light module 50 low via the first output terminal, and the emergency light in the emergency light module 50 does not operate. When the triac switch S1 is in a closed state, the output voltage signal from the boost portion of the boost module 10 passes through the boost voltage terminal VOUT, the node boost output terminal VL, the triac switch S1, the AC live line L, the grid equivalent impedance RLN, the AC neutral line N, and the boost freewheeling circuit 30, forming a path. The path current causes the output voltage signal to produce a falling edge. This falling edge is sampled through the third resistor R3 and the fourth resistor R4 and sent to the control chip U2. At this point, the control chip U2 outputs a high level via the first output terminal, driving the emergency light in the emergency light module 50 to operate while initiating the next intermittent detection cycle.

In a possible implementation, the boost freewheeling circuit 30 includes a first NMOS transistor Qn1 and a seventh resistor R7.

A base of the first NMOS transistor Qn1 is electrically connected to the boost freewheeling drive terminal of the grid status detection and control module 20, a drain of the first NMOS transistor Qn1 is electrically connected to a first terminal of the seventh resistor R7, and a source of the first NMOS transistor Qn1 is electrically grounded.

A second terminal of the seventh resistor R7 is configured to be electrically connected to the AC neutral line N.

In this embodiment, the first NMOS transistor Qn1 is a conventional N-type MOS transistor. The seventh resistor R7 is a conventional model resistor. The base of the first NMOS transistor Qn1 conducts when it receives a high level, and turns off when it receives a low level.

The present invention further provides an emergency lighting apparatus compatible with a triac dimmer, including the emergency battery 40, the emergency light module 50, and the emergency detection circuit as described above.

The positive electrode of the emergency battery 40 is electrically connected to the power terminal of the grid status detection and control module 20, the power terminal of the boost module 10, and an input terminal of the emergency light module 50, and a negative electrode of the emergency battery 40 and an output terminal of the emergency light module 50 are both electrically grounded.

The control terminal of the emergency light module 50 is electrically connected to the emergency light drive terminal of the grid status detection and control module 20 in the emergency detection circuit.

In a possible implementation, in the emergency lighting apparatus, the emergency light module 50 includes an emergency light and a second NMOS transistor Qn2.

A positive electrode of the emergency light LED is electrically connected to the positive electrode of the emergency battery 40, and a negative electrode of the emergency light LED is electrically connected to a drain of the second NMOS transistor Qn2.

A base of the second NMOS transistor Qn2 is electrically connected to the emergency light drive terminal of the grid status detection and control module 20 in the emergency detection circuit.

In this embodiment, the emergency light LED may be a conventional LED light. The second NMOS transistor Qn2 may be a conventional N-type MOS transistor. When the emergency battery 40 serves as an emergency power source to provide electrical energy to the emergency light LED, the conduction and cutoff of the second NMOS transistor Qn2 control the on and off states of the emergency light LED.

In a possible implementation, the emergency lighting apparatus further includes the rectifier circuit 60 and the triac dimmer 70.

The positive electrode output terminal of the rectifier circuit 60 is electrically connected to the voltage sampling terminal of the grid status detection and control module 20, the first input terminal of the rectifier circuit 60 is electrically connected to both the boost output terminal VL of the boost module 10 and the first terminal of the triac dimmer 70, a second input terminal of the rectifier circuit 60 is configured to be electrically connected to the AC neutral line N, and a negative electrode output terminal of the rectifier circuit 60 is electrically grounded.

In a possible implementation, in the emergency lighting apparatus, the boost module 10 includes a boost control chip U1, a PMOS transistor Qp, an inductor L1, a first diode D1, a second diode D2, a first resistor R1, a second resistor R2, and a capacitor C1.

A battery terminal BAT of the boost control chip U1 is electrically connected to a source of the PMOS transistor Qp and connected to the positive electrode of the emergency battery 40, a first sampling pin CSN of the boost control chip U1 is electrically connected to both a drain of the PMOS transistor Qp and a first terminal of the inductor L1, a switch transistor pin LX of the boost control chip U1 is electrically connected to both a second terminal of the inductor L1 and a positive electrode of the first diode D1, a second sampling pin CY of the boost control chip U1 is electrically connected to both a first terminal of the first resistor R1 and a first terminal of the second resistor R2, and a ground pin GND of the boost control chip U1 is electrically connected to all a negative electrode of the emergency battery 40, a second terminal of the second resistor R2, and a first terminal of the capacitor C1, and grounded.

A base of the PMOS transistor Qp is electrically connected to the enable terminal EN of the grid status detection and control module 20.

A negative electrode of the first diode D1 is electrically connected to all a positive electrode of the second diode D2, a second terminal of the first resistor R1, and a second terminal of the capacitor C1, and serves as the boost voltage terminal VOUT.

A negative electrode of the second diode D2 serves as the boost output terminal VL.

In a possible implementation, in the emergency lighting apparatus, the grid status detection and control module 20 includes a control chip U2, a third resistor R3, a fourth resistor R4, a fifth resistor R5, and a sixth resistor R6.

A power terminal of the control chip U2 is electrically connected to the positive electrode of the emergency battery 40, an enable terminal of the control chip U2 is electrically connected to the control terminal of the boost module 10, a first output terminal of the control chip U2 is electrically connected to the control terminal of the emergency light module 50, a second output terminal of the control chip U2 is electrically connected to the control terminal of the boost freewheeling circuit 30, a first sampling terminal of the control chip U2 is electrically connected to both a first terminal of the third resistor R3 and a first terminal of the fourth resistor R4, a second sampling terminal of the control chip U2 is electrically connected to both a first terminal of the fifth resistor R5 and a second terminal of the sixth resistor R6, and a ground terminal of the control chip U2, a second terminal of the fourth resistor R4, and the second terminal of the sixth resistor R6 are all electrically grounded.

A second terminal of the third resistor R3 is electrically connected to the boost voltage terminal VOUT of the boost module 10.

A second terminal of the fifth resistor R5 is configured to be electrically connected to an output terminal of the rectifier circuit 60.

In a possible implementation, in the emergency lighting apparatus, the boost freewheeling circuit 30 includes a first NMOS transistor Qn1 and a seventh resistor R7.

A base of the first NMOS transistor Qn1 is electrically connected to the boost freewheeling drive terminal of the grid status detection and control module 20, a drain of the first NMOS transistor Qn1 is electrically connected to a first terminal of the seventh resistor R7, and a source of the first NMOS transistor Qn1 is electrically grounded.

A second terminal of the seventh resistor R7 is configured to be electrically connected to the AC neutral line N.

The above embodiments should not limit the present invention in any way. All technical solutions obtained through equivalent substitution or equivalent transformation fall within the protection scope of the present invention.

What is claimed is:

1. An emergency detection circuit compatible with a triac dimmer, comprising a boost module, a grid status detection and control module, and a boost freewheeling circuit, wherein an enable terminal and a boost voltage sampling terminal of the grid status detection and control module are electrically connected to a control terminal and a boost voltage terminal of the boost module respectively, a boost freewheeling drive terminal of the grid status detection and control module is electrically connected to a control terminal of the boost freewheeling circuit, a power terminal of the grid status detection and control module is configured to be electrically connected to a positive electrode of an emergency battery, an emergency light drive terminal of the grid status detection and control module is configured to be electrically connected to a control terminal of an emergency light module, and a voltage sampling terminal of the grid status detection and control module is configured to be electrically connected to a positive electrode output terminal of a rectifier circuit;

a boost output terminal of the boost module is configured to be electrically connected to both a first terminal of the triac dimmer and a first input terminal of the rectifier circuit, and a power terminal of the boost module is electrically connected to the positive electrode of the emergency battery;

an input terminal of the boost freewheeling circuit is configured to be electrically connected to an AC (alternating current) neutral line, and an output terminal of the boost freewheeling circuit is electrically connected to ground; and a second terminal of the triac dimmer is configured to be electrically connected to an AC live line; wherein when detecting an abnormal AC voltage, the grid status detection and control module controls the boost module to provide a boost voltage in an intermittent periodic manner and controls the boost freewheeling circuit to conduct;

the triac dimmer is subjected to the boost voltage to ensure normal operation of a triac switch thereof; and the grid status detection and control module samples a voltage signal via the boost voltage sampling terminal and determines, based on a sampled voltage, whether to control the emergency light module to enter an emergency lighting mode.

2. The emergency detection circuit according to claim 1, wherein the boost module comprises a boost control chip, a PMOS transistor, an inductor, a first diode, a second diode, a first resistor, a second resistor, and a capacitor, wherein a battery terminal of the boost control chip is electrically connected to a source of the PMOS transistor and configured to be connected to the positive electrode of the emergency battery, a first sampling pin of the boost control chip is electrically connected to both a drain of the PMOS transistor and a first terminal of the inductor, a switch transistor pin of the boost control chip is electrically connected to both a second terminal of the inductor and a positive electrode of the first diode, a second sampling pin of the boost control chip is electrically connected to both a first terminal of the first resistor and a first terminal of the second resistor, and a ground pin of the boost control chip is electrically connected to all a negative electrode of the emergency battery, a second terminal of the second resistor, and a first terminal of the capacitor, and grounded;

a base of the PMOS transistor is electrically connected to the enable terminal of the grid status detection and control module;

a negative electrode of the first diode is electrically connected to all a positive electrode of the second diode, a second terminal of the first resistor, and a second terminal of the capacitor, and serves as the boost voltage terminal; and a negative electrode of the second diode serves as the boost output terminal.

3. The emergency detection circuit according to claim 1, wherein the grid status detection and control module comprises a control chip, a third resistor, a fourth resistor, a fifth resistor, and a sixth resistor, wherein a power terminal of the control chip is configured to be electrically connected to the positive electrode of the emergency battery, an enable terminal of the control chip is electrically connected to the control terminal of the boost module, a first output terminal of the control chip is configured to be electrically connected to the control terminal of the emergency light module, a second output terminal of the control chip is electrically connected to the control terminal of the boost freewheeling circuit, a first sampling terminal of the control chip is electrically connected to both a first terminal of the third resistor and a first terminal of the fourth resistor, a second sampling terminal of the control chip is electrically connected to both a first terminal of the fifth resistor and a second terminal of the sixth resistor, and a ground terminal of the control chip, a second terminal of the fourth resistor, and the second terminal of the sixth resistor are all electrically grounded;

a second terminal of the third resistor is electrically connected to the boost voltage terminal of the boost module; and a second terminal of the fifth resistor is configured to be electrically connected to an output terminal of the rectifier circuit.

4. The emergency detection circuit according to claim 1, wherein the boost freewheeling circuit comprises a first NMOS transistor and a seventh resistor, wherein a base of the first NMOS transistor is electrically connected to the boost freewheeling drive terminal of the grid status detection and control module, a drain of the first NMOS transistor is electrically connected to a first terminal of the seventh resistor, and a source of the first NMOS transistor is electrically grounded; and a second terminal of the seventh resistor is configured to be electrically connected to the AC neutral line.

5. An emergency lighting apparatus compatible with a triac dimmer, comprising the emergency battery, the emergency light module, and the emergency detection circuit according to claim 1, wherein the positive electrode of the emergency battery is electrically connected to all the power terminal of the grid status detection and control module, the power terminal of the boost module, and an input terminal of the emergency light module, and a negative electrode of the emergency battery and an output terminal of the emergency light module are both electrically grounded; and the control terminal of the emergency light module is electrically connected to the emergency light drive terminal of the grid status detection and control module in the emergency detection circuit.

6. The emergency lighting apparatus according to claim 5, wherein the emergency light module comprises an emergency light and a second NMOS transistor, wherein a positive electrode of the emergency light is electrically connected to the positive electrode of the emergency battery, and a negative electrode of the emergency light is electrically connected to a drain of the second NMOS transistor; and a base of the second NMOS transistor is electrically connected to the emergency light drive terminal of the grid status detection and control module in the emergency detection circuit.

7. The emergency lighting apparatus according to claim 5, further comprising the rectifier circuit and the triac dimmer, wherein the positive electrode output terminal of the rectifier circuit is electrically connected to the voltage sampling terminal of the grid status detection and control module, the first input terminal of the rectifier circuit is electrically connected to both the boost output terminal of the boost module and the first terminal of the triac dimmer, a second input terminal of the rectifier circuit is configured to be electrically connected to the AC neutral line, and a negative electrode output terminal of the rectifier circuit is electrically grounded.

8. The emergency lighting apparatus according to claim 5, wherein the boost module comprises a boost control chip, a PMOS transistor, an inductor, a first diode, a second diode, a first resistor, a second resistor, and a capacitor, wherein a battery terminal of the boost control chip is electrically connected to a source of the PMOS transistor and connected to the positive electrode of the emergency battery, a first sampling pin of the boost control chip is electrically connected to both a drain of the PMOS transistor and a first terminal of the inductor, a switch transistor pin of the boost control chip is electrically connected to both a second terminal of the inductor and a positive electrode of the first diode, a second sampling pin of the boost control chip is electrically connected to both a first terminal of the first resistor and a first terminal of the second resistor, and a ground pin of the boost control chip is electrically connected to all a negative electrode of the emergency battery, a second terminal of the second resistor, and a first terminal of the capacitor, and grounded;

a base of the PMOS transistor is electrically connected to the enable terminal of the grid status detection and control module;

a negative electrode of the first diode is electrically connected to all a positive electrode of the second diode, a second terminal of the first resistor, and a second terminal of the capacitor, and serves as the boost voltage terminal; and a negative electrode of the second diode serves as the boost output terminal.

9. The emergency lighting apparatus according to claim 5, wherein the grid status detection and control module comprises a control chip, a third resistor, a fourth resistor, a fifth resistor, and a sixth resistor, wherein a power terminal of the control chip is electrically connected to the positive electrode of the emergency battery, an enable terminal of the control chip is electrically connected to the control terminal of the boost module, a first output terminal of the control chip is electrically connected to the control terminal of the emergency light module, a second output terminal of the control chip is electrically connected to the control terminal of the boost freewheeling circuit, a first sampling terminal of the control chip is electrically connected to both a first terminal of the third resistor and a first terminal of the fourth resistor, a second sampling terminal of the control chip is electrically connected to both a first terminal of the fifth resistor and a second terminal of the sixth resistor, and a ground terminal of the control chip, a second terminal of the fourth resistor, and the second terminal of the sixth resistor are all electrically grounded;

a second terminal of the third resistor is electrically connected to the boost voltage terminal of the boost module; and a second terminal of the fifth resistor is configured to be electrically connected to an output terminal of the rectifier circuit.

10. The emergency lighting apparatus according to claim 5, wherein the boost freewheeling circuit comprises a first NMOS transistor and a seventh resistor, wherein a base of the first NMOS transistor is electrically connected to the boost freewheeling drive terminal of the grid status detection and control module, a drain of the first NMOS transistor is electrically connected to a first terminal of the seventh resistor, and a source of the first NMOS transistor is electrically grounded; and a second terminal of the seventh resistor is configured to be electrically connected to the AC neutral line.

* * * * *